United States Patent [19]

Vrinssen et al.

[11] Patent Number: 4,611,052

[45] Date of Patent: Sep. 9, 1986

[54] PROCESS FOR THE PREPARATION OF A NYLON BLOCK COPOLYMER WITH MIXTURE OF HIGH MOLECULAR WEIGHT ACTIVATOR REACTANT AND LOW MOLECULAR WEIGHT ACTIVATOR REACTANT

[75] Inventors: Cornelis H. Vrinssen, Geleen; Albert A. van Gennen, Brunssum; Jozef J. M. Bongers, Elsloo, all of Netherlands

[73] Assignee: Stamicarbon B.V., Geleen, Netherlands

[21] Appl. No.: 694,624

[22] Filed: Jan. 24, 1985

[30] Foreign Application Priority Data

Feb. 9, 1984 [NL] Netherlands ................. 8400411

[51] Int. Cl.⁴ ............................................. C08G 69/20
[52] U.S. Cl. ................................ 528/312; 525/420; 525/432; 528/315; 528/323
[58] Field of Search ................ 528/312, 315, 323; 525/432, 420

[56] References Cited

U.S. PATENT DOCUMENTS

| 3,245,961 | 8/1962 | Fetscher et al. | 260/77.5 |
| 3,511,893 | 7/1967 | Schaeffer et al. | 260/858 |
| 4,501,821 | 2/1985 | Hodek et al. | 528/310 |

FOREIGN PATENT DOCUMENTS

| 67693 | 12/1982 | European Pat. Off. |
| 67694 | 12/1982 | European Pat. Off. |
| 67695 | 12/1982 | European Pat. Off. |
| 57-33014 | 9/1983 | Japan |
| 1067153 | 5/1967 | United Kingdom |

OTHER PUBLICATIONS

Hedrick et al., "A New RIM System from Nylon 6 Block Copolymers: Chemistry and Structure", Aug. 17, 1981, Detroit, MI pp. 3–5.

Allen et al., "Caprolactam Based Block Copolymers Using Polymeric Activators", pp. 321–343, (1977).

Primary Examiner—Harold D. Anderson
Attorney, Agent, or Firm—Cushman, Darby & Cushman

[57] ABSTRACT

The invention relates to a process for the preparation of a nylon block copolymer composition by polymerization of lactam in the presence of a lactam-polymerization catalyst and an activator, characterized in that the activator used is a combination of:
1. a high molecular weight lactam-terminated activator with a molecular weight of at least 1500, and
2. a low molecular weight lactam-terminated activator with a molecular weight of at most 750.

The process according to the invention can, in particular, be used in a reaction injection moulding process, in which liquid reaction component are introduced into a mould where fast polymerization to a moulded object takes place.

13 Claims, No Drawings

PROCESS FOR THE PREPARATION OF A NYLON BLOCK COPOLYMER WITH MIXTURE OF HIGH MOLECULAR WEIGHT ACTIVATOR REACTANT AND LOW MOLECULAR WEIGHT ACTIVATOR REACTANT

FIELD OF THE INVENTION

The present invention relates to a process for preparing a nylon block copolymer composition by polymerizing a lactam or lactams in the presence of a lactam-polymerization catalyst and an activator.

BACKGROUND OF THE PRESENT INVENTION

Various already known processes are described in various publications.

In U.S. Pat. No. 3,018,273, a process for anionic polymerization of caprolactam is described in which an organomagnesium compound is used as a catalyst and a N-N diacyl compound as an activator.

U.K. Pat. No. 1,067,153 describes a process for the preparation of nylon block copolymers by polymerization of caprolactam in the presence of various types of activators. In the example, the application of an isocyanate-terminated polypropylene glycol as an activator and a potassium compound as a catalyst is described.

U.S. Pat. No. 3,862,262, U.S. Pat. No. 4,031,164, U.S. Pat. No. 4,223,112, U.S. Pat. No. 4,034,015, U.S. Pat. No. 3,925,325, U.S. Pat. No. 3,965,075 and U.S. Pat. No. Re. 30,371 describe various aspects in the preparation of activators used for polymerizing lactams and of the polymerization of lactam proper. More particularly, U.S. Pat. No. 3,862,262 describes lactam-polyol-acyl-polylactam block copolymers. U.S. Pat. No. 4,031,164 and U.S. Pat. No. 4,223,112 describe lactam-polyol-polyacyl lactam block copolymers having specific ratios of the several components. U.S. Pat. No. 4,034,015 relates to nylon block copolymers having at least 5 percent ester and group termination.

The other patents mentioned relate to the preparation of ester-amide compounds by condensation of alcohol and acyl lactam in the presence of catalysts of various types.

The European Patent Applications Nos. 67693, 67694 and 67695 relate to acyl-halide and acyl-lactam compounds and to a process for preparing nylon block copolymers therewith. The acyl-halide and acyl-lactam compounds are described by complex formulas.

The known systems on the basis of a high molecular weight activator, i.e. an activator obtained by reaction of a polyol with a compound containing activator groups, have the disadvantage that there is an upper limit to the molecular weight and the valency of the polyol. This is because, in order for the lactam polymerization to proceed well, a minimum concentration of activator groups relative to the amount of lactam is required.

As the molecular weight of the polyol becomes higher, the activator concentration will decrease. This makes it highly or totally impracticable to use a very high molecular weight polyol.

SUMMARY OF THE PRESENT INVENTION

The present invention relates to a process for preparing a nylon block copolymer composition by polymerization of a lactam(s) in the presence of a lactam-polymerization catalyst and an activator wherein the activator employed is a combination of (a) a high molecular weight lactam-terminated activator having a molecular weight of at least 1500 and (b) a low molecular weight lactam-terminated activator having a molecular weight of at most 750.

One object of the invention is to provide a process for the preparation of a nylon block copolymer composition in which higher molecular weight polyols can be used.

DETAILED DESCRIPTION OF THE PRESENT INVENTION

The process according to the invention is characterized in that the activator used is a combination of a high molecular weight lactam-terminated activator with a molecular weight of at least 1500 and a low molecular weight lactam-terminated activator with a molecular weight of at most 750.

In particular, the process according to the present invention can be used in a reaction injection moulding process, in which liquid reaction components are introduced into a mould where fast polymerization to a moulded object takes place.

The high molecular weight lactam-terminated activator is preferably the product of a reaction between a polyol and a compound containing activator groups. With the process according to the invention, such an activator yields the best results with regard to impact strength.

As polyol, in principle any polyol can be used, but in view of the mechanical properties to be obtained preference is given to rubbery polyols with an equivalent weight of at least 300, more in particular of between 1000 and 5000. With an equivalent weight of more than 5000, the properties of the nylon block copolymer may deteriorate.

Suitable polyols are polyether polyols, polyester polyols, polybutadiene polyols, siloxane-containing polyols and/or the so-called polymeric polyols. These polymeric polyols include polyols grafted with, for example, acrylonitrile, but also the polyurea dispersions obtained by reacting equivalent amounts of diamine or hydrazine with diisocyanate dissolved in the polyol.

The terms molecular weight and equivalent weight, as used herein, means to the number-average molcular weight.

The equivalent weight of a polyol refers to number-average molecular weight of the polyol per hydroxyl group, that is, the molecular weight divided by the functionality.

The compound supplying the activator groups is preferably the same compound as the low molecular weight activator.

Suitable compounds supplying activator groups are:
lactam terminated polyisocyanate and
polyacyl-lactam compound.

The lactam-terminated polyisocyanate can be prepared by reacting a lactam, such as caprolactam, and a polyisocyanate.

Various polyisocyanates are suitable for application in the present invention. They can be aliphatic, aralphatic, alicyclic and aromatic isocyanates.

Examples of suitable isocyanates are hexamethylene diisocyanate (HDI), xylylene diisocyanate (XDI), isophorone diisocyanate, toluene diisocyanate (TDI), MDI, and hydrogenated TDI, XDI or MDI, modified MDI (e.g. with carbodiimide).

The polyacyl lactam compound can be prepared by reacting a polyacyl compound, e.g. a polyacyl chloride compound, with lactam.

Suitable polyacyl lactam compounds are, for example, terephthaloylbiscaprolactam, adipoylbiscaprolactam, oxaloylbiscaprolactam, isophthaloylbiscaprolactam or mixtures of two or more of these compounds.

As indicated above, the compound containing activator groups is used not only for the preparation of the high molecular weight activator but also as low molecular weight activator.

One of the possibilities for the preparation of the high molecular weight activator is the reaction of the compound containing activator groups with a polyol in the presence of a suitable catalyst, such as an alkali metal, an alkalimetal compound or a Lewis acid.

The ratio of the two activators is determined by, among other things, the molecular weight of the high molecular weight activator and by the desired properties of the nylon block copolymer composition.

The ratio is preferably chosen so that, for every hundred activator groups from the high molecular weight activator, 50-1000, more in particular 75-250 activator groups form the low molecular weight accelerator are present.

For the preparation of the nylon blocks a variety of lactams can be used, such as 2-pyrrolidone, 2-piperidone, lauryl lactam and caprolactam, but also substituted lactams, or mixtures of two or more lactams.

More in particular, caprolactam is used, since caprolactam has the most favourable reaction rate under anionic polymerization conditions.

As a catalyst, the known lactam polymerization catalysts can be used, such a alkalimetal compounds and Grignard compounds, more in particular sodium lactamate, potassium lactamate and lactam magnesium bromide.

The invention further relates to a nylon block copolymer composition so obtained, and to an object wholly or in part made of such a nylon block copolymer composition.

In the following Examples and in the Tables reporting results, the following abbreviations are used. NaL means sodium lactamate. LMB means lactam magnesium bromide. The designation "x" means that no measurement was taken because polymerization failed to occur within the designated 30 minute time frame. HCBL means caprolactam blocked hexamethylene diisocyanate. TCB means terephthaloylbiscaprolactam. In Table III and Examples 14–19, the term "low molecular weight activator type" relates to caprolactam terminated hexamethylene diisocyanate (HCBL) or terephthaloylbiscaprolactam (TCB) and the term "high molecular weight activator" relates to the reaction product of caprolactam terminated hexamethylene diisocyanate with propylene glycol.

EXAMPLES

In the examples below, the invention is further explained.

In the Examples 1 through 8, a number of modes of realizing the invention are explained, the molecular weight of the high molecular weight activator, the functionality of the activator and the amount of high molecular weight and low molecular weight activator being varied.

The functionality of the high molecular weight activator has been varied by using varying amounts of polyol and activator-groups-supplying compound in its preparation. Reaction of 1 mole of tetrol with 4 moles of lactam-terminated hexamethylene diisocyanate yields a functionality of 4, whereas 2 moles of tetrol and 7 moles of lactam-terminated hexamethylene diisocyanate yield an activator with valency 6, with a molecular weight which is about twice as high.

The examples 9 through 13 are comparative examples, in which no low molecular weight activator is used. These examples show, among other things, that when the molecular weight of the activator is increased the number of activator groups decreases to below a critical value, so that no more polymerization takes place.

The examples 14 through 21 relate to a diol activator.

EXAMPLES 1-8

A number of lactam polymerization activators were prepared based on a number of different tetrols and caprolactam-terminated hexamethylene diisocyanate.

Molten caprolactam was polymerized at 130° C. with the aid of these activators, using sodium lactamate as a catalyst. Caprolactam-terminated hexamethylene diisocyanate was used as the low molecular weight activator. The compositions of the polymerization mixtures and the results are summarized in Table I.

The columns in Table I represent, from left to right, the number of the Example, the type of polyol (tetrol), the functionality of the activator, the number-average molecular weight of the high molecular weight activator, the amounts of activator groups originating from the high molecular weight activator and the low molecular weight activator, respectively the amount of sodium lactamate (NAL) used, the impact strength and the E-modulus. The percentages given in the several Tables are all relative to the amount of caprolactam.

EXAMPLES 9-13

A number of comparative examples were carried out in the same manner as the Examples 1 through 8 except that no low molecular weight activator was added. Table II lists the compositions of the polymerization mixtures and the results in the same way as Table I.

EXAMPLES 14-19

An activator was prepared based polypropylene glycol and caprolactam-terminated hexamethylene diisocyanate, in a molar ratio of 1:2. This activator was used in varying amounts for the polymerization of caprolactam at 130° C. in the presence of two different low molecular weight activators and using lactam magnesium bromide as a catalyst.

Table III lists the compositions of the starting materials and the results.

TABLE I

| Example | polyol | Activator functionality | Molecular Weight | eq. % high MW activator | eq. % low MW activator | Sodium Lactamate (NAL) mole % | Izod kJm$^{-2}$ | E-mod Nmm$^{-2}$ |
|---|---|---|---|---|---|---|---|---|
| 1 | Tetronic 707 | 4 | 12,000 | 0.95 | 0.95 | 0.95 | 70 | 590 |
| 2 | Tetronic 1307 | 4 | 18,600 | 0.62 | 0.77 | 0.69 | 14.5 | 494 |
| 3 | Tetronic 908 | 4 | 26,100 | 0.43 | 1.57 | 1.00 | 5 | 1120 |
| 4 | Tetronic 1302 | 6 | 15,600 | 1.12 | 0.90 | 1.02 | 78 | 610 |
| 5 | Tetronic 1104 | 6 | 16,600 | 1.04 | 1.04 | 1.04 | 66 | 680 |
| 6 | Tetronic 707 | 6 | 24,000 | 0.71 | 1.29 | 1.00 | 71 | 760 |
| 7 | Tetronic 1307 | 6 | 37,200 | 0.47 | 0.93 | 0.70 | 11 | 520 |
| 8 | Tetronic 1307 | 6 | 37,200 | 0.38 | 2.42 | 1.40 | 5 | 1070 |

TABLE II

| Example | polyol | Activator functionality | Molecular Weight | eq. % high MW activator | eq. % low MW activator | Sodium Lactamate (NAL) mole % | Izod kJm$^{-2}$ | E-mod Nmm$^{-2}$ |
|---|---|---|---|---|---|---|---|---|
| 9 | Tetronic 901 | 6 | 9,400 | 1.84 | — | 0.92 | 36 | 660 |
| 10 | Tetronic 1302 | 6 | 15,600 | 1.12 | — | 0.56 | * | * |
| 11 | Tetronic 1104 | 6 | 16,600 | 1.04 | — | 0.52 | * | * |
| 12 | Tetronic 1104 | 4 | 8,300 | 1.38 | — | 0.69 | 71 | 520 |
| 13 | Tetronic 707 | 4 | 12,000 | 0.95 | — | 0.48 | * | * |

*Polymerization did not take place within 30 minutes.

TABLE III

| Example | high molecular weight activator[1] (eq. %) | low molecular weight activator[2] (eq. %) | | Lactam Magnesium Bromide (LMB) (mole %) | Izod kJm$^{-2}$ | E-mod. Nmm$^{-2}$ |
|---|---|---|---|---|---|---|
| 14 | 0.7 | HCBL | 1.6 | 1.5 | 26 | 1853 |
| 15 | 0.7 | TBC | 0.8 | 1.5 | 12.5 | 2317 |
| 16 | 1.05 | TBC | 0.45 | 1.6 | 15 | 1990 |
| 17 | 1.5 | TBC | 0.75 | 1.7 | 34 | 876 |
| 18 | 1.5 | HCBL | 0.75 | 1.7 | 26 | 760 |
| 19 | 1.5 | HCBL | 1.5 | 1.7 | 16 | 1010 |

[1]The high molecular weight activator is the reaction product of propylene glycol and caprolactam terminated hexamethylene diisocyanate.
[2]The low molecular weight activator is terephthaloyl biscaprolactam (TBC) or lactam terminated hexamethyl diisocyanate (HCBL).

We claim:
1. Process for preparing a nylon block copolymer composition comprising:
polymerizing at least one lactam in the presence of a lactam-polymerization catalyst and a reactant activator, wherein the reactant activator comprises:
(a) a high molecular weight lactam-terminated activator having a molecular weight of at least 1500, said high molecular weight lactam-terminated activator obtained by reacting a polyol with a low molecular weight lactam-terminated activator; and
(b) a low molecular weight lactam-terminated activator, said low molecular weight lactam-terminated activator having a molecular weight of at most 750 wherein said low molecular weight lactam-terminated activator is a lactam-terminated polyisocyanate or polyacyl-lactam compound,
wherein said process:
said polyacyl lactam activator has the following formula:

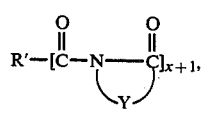

said lactam terminated polyisocyanate has the following formula:

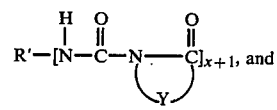

said high molecular weight activator is:

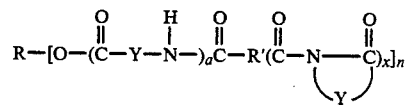

or:

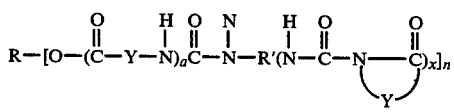

wherein the above formulas:
R' is the organic residue of a polyisocyanate or a polyacyl compound,
R is the organic residue of a polyol,
a is a value between 0 and 1,
n is greater than or equal to 2,
x+1 equals the functionality of the low molecular weight activator compound, and Y is the residue of the lactam ring of the said activator compounds.

2. Process according to claim 1, wherein said low molecular weight activator is a diacyl lactam compound or an N-substituted carbamoyl lactam compound.

3. Process according to claim 1, wherein a combination of a high molecular weight activator and a low molecular weight activator is used such that for every hundred activator groups of the high molecular weight activator, 50-1000 activator groups from the low molecular weight are present.

4. Process according to claim 3, wherein for every hundred activator groups from the high molecular weight activator 75-250 activator groups from the low molecular weight activator are present.

5. Process according to claim 1, wherein the polyol has an equivalent weight of at least 300.

6. Process according to claim 5, wherein the equivalent weight is 1000 to 5000.

7. Process according to claim 1, wherein the lactam being polymerized is 2-pyrrolidone, 2-piperidone, caprolactam, lauryl lactam, or a mixture thereof.

8. Process according to claim 1 wherein said low molecular weight activator is a lactam terminated polyisocyanate obtained by reacting caprolactam and a diisocyanate selected from the group consisting of hexamethylenediisocyanate, xylylenediisocyanate, isophoronediisocyanate, toluenediisocyanate, 2,2'-, 2,4'- and 4,4'- diphenylmethanediisocyanate, hydrogenated toluenediisocyanate, hydrogenated xylylenediisocyanate, hydrogenated 2,2'-, 2,4'- and 4,4'diphenylmethanediisocyanate, carbodiimide modified 2,2'-, 2,4'- and 4,4'-diphenylmethanediisocyanate and mixtures thereof.

9. Process according to claim 8 wherein the equivalent weight of the polyol is between 1,000 and 5,000.

10. Process according to claim 9 wherein a combination of a high molecular weight activator and a low molecular weight activator is used such that 50-1,000 activator groups from the low molecular weight activator are present for every 100 activator groups of the high molecular weight activator.

11. Process according to claim 1 wherein said low molecular weight activator is a polyacyl lactam compound selected from the group consisting of terephthaloylbiscaprolactam, adipoylbiscaprolactam, oxaloylbiscaprolactam, isophthaloylbiscaprolactam and mixtures thereof.

12. Process according to claim 11 wherein the equivalent weight of the polyol is between 1,000 and 5,000.

13. Process according to claim 11 wherein a combination of a high molecular weight activator and a low molecular weight activator is used such that 50-1,000 activator groups from the low molecular weight activator are present for every 100 activator groups of the high molecular weight activator.

* * * * *

UNITED STATES PATENT AND TRADEMARK OFFICE
CERTIFICATE OF CORRECTION

PATENT NO. : 4,611,052
DATED : September 9, 1986
INVENTOR(S) : Cornelis H. Vrinssen, et al.

It is certified that error appears in the above-identified patent and that said Letters Patent is hereby corrected as shown below:

The name of the second inventor should appear:

Albert A. van Geenen

Signed and Sealed this

Thirtieth Day of December, 1986

*Attest:*

DONALD J. QUIGG

*Attesting Officer*  *Commissioner of Patents and Trademarks*